(12) United States Patent
Pachciarz et al.

(10) Patent No.: US 6,276,387 B1
(45) Date of Patent: Aug. 21, 2001

(54) FUEL VAPOR CONTROL APPARATUS

(75) Inventors: Mahlon Richard Pachciarz, Grand Blanc; Edward A. Beutler, Flushing, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/535,925

(22) Filed: Mar. 23, 2000

Related U.S. Application Data

(60) Provisional application No. 60/138,187, filed on Jun. 8, 1999.

(51) Int. Cl.[7] .................................................. F12K 17/04
(52) U.S. Cl. ............................ 137/43; 137/202; 137/587; 123/516; 123/519
(58) Field of Search .................................... 137/587, 202, 137/43; 123/519, 516

(56) References Cited

U.S. PATENT DOCUMENTS

| | | | |
|---|---|---|---|
| 5,392,804 | * | 2/1995 | Kondo et al. .......................... 137/202 |
| 5,462,100 | * | 10/1995 | Covert et al. ....................... 137/43 X |
| 5,687,778 | * | 11/1997 | Harris ................................. 137/43 X |
| 5,813,434 | * | 9/1998 | Horiuchi et al. ...................... 137/587 |
| 5,860,458 | * | 1/1999 | Benjey et al. .................... 137/202 X |

* cited by examiner

*Primary Examiner*—A. Michael Chambers
(74) *Attorney, Agent, or Firm*—Vincent A. Cichosz

(57) ABSTRACT

A fuel vapor control apparatus on a motor vehicle fuel tank including a vapor storage canister, a plurality of vent valves on the fuel tank, a plurality of vapor ducts between the vent valves and the vapor storage canister, a plurality of primary liquid traps, and a secondary liquid trap which cooperates with the primary liquid traps in preventing liquid fuel leaking through the vent valves from reaching and contaminating the vapor storage canister. The primary liquid traps are segments of respective ones of the vapor ducts defining standpipes above corresponding ones of the vent valves when the fuel tank is inclined. The primary liquid traps retain liquid fuel leaking through the vent valves and drain by gravity to the fuel tank when the incline of the fuel tank is reduced to zero. The secondary liquid trap is a secondary tank on the top of the fuel tank interposed between the vapor storage canister and the segments of the vapor ducts defining the standpipes. The secondary tank retains liquid fuel which overflows any one of the standpipes and also drains by gravity to the fuel tank when the incline of the fuel tank is reduced to zero.

5 Claims, 2 Drawing Sheets

FUEL VAPOR CONTROL APPARATUS

RELATED PATENT APPLICATION

This application claims the benefit of U. S. Provisional Patent Application No. 60/138,187, filed Jun. 8, 1999.

TECHNICAL FIELD

This invention relates to a fuel vapor control apparatus on a motor vehicle.

BACKGROUND OF THE INVENTION

A motor vehicle typically includes a fuel vapor control apparatus which exposes a vapor dome in a fuel tank of the vehicle to the atmosphere without releasing fuel vapor. The fuel vapor control apparatus commonly includes a vapor storage canister, a vent valve exposed to a vapor dome above a pool of liquid fuel in the fuel tank, and a vapor duct between the vent valve and the storage canister. A mixture of air and fuel vapor migrates from the vapor dome to the storage canister where an adsorbent, e.g. carbon granules, strips the fuel vapor from the mixture so that only uncontaminated air exhausts from the canister to the atmosphere. The fuel vapor is retained on the adsorbent until the canister is later purged by combustion air. In order to maintain exposure of the vapor dome to the atmosphere when the motor vehicle is parked on an incline, e.g. on a parking deck ramp or on a hill, it is known to mount a plurality of vent valves on the top of the fuel tank at locations which assure that at least one of the vent valves always communicates with the vapor dome even though others may be submerged in liquid fuel. Because the performance of adsorbents degrades when contaminated by liquid fuel, vent valves in fuel vapor control apparatuses are typically constructed to automatically close when submerged in liquid fuel Even when a vent valve is closed, however, there is a risk of leakage of liquid fuel through the vent valve if the motor vehicle remains parked on the incline for an extended period. Accordingly, the industry continues to seek improved fuel vapor control apparatuses which minimize the likelihood of adsorbent contamination by liquid fuel leaking through vent valves submerged in liquid fuel.

SUMMARY OF THE INVENTION

This invention is a new and improved fuel vapor control apparatus for suppressing release to the atmosphere of fuel vapor from a vapor dome in a fuel tank of a motor vehicle including a vapor storage canister, a plurality of vent valves on the fuel tank, a plurality of vapor ducts between the vent valves and the vapor storage canister, a plurality of primary liquid traps, and a secondary liquid trap which cooperates with the primary liquid traps in preventing liquid fuel leaking through the vent valves from reaching and contaminating the vapor storage canister. The primary liquid traps are segments of respective ones of the vapor ducts defining standpipes above corresponding ones of the vent valves when the fuel tank is inclined. The primary liquid traps retain liquid fuel leaking through the vent valves and drain by gravity to the fuel tank when the incline of the fuel tank is reduced to zero. The secondary liquid trap is a secondary tank on the top of the fuel tank interposed between the vapor storage canister and the segments of the vapor ducts defining the standpipes. The secondary tank retains liquid fuel which overflows any one of the standpipes and drains by gravity to the fuel tank through at least one of the vapor ducts when the incline of the fuel tank is reduced to zero.

DESCRIPTION OF THE PREFERRED EMBODIMENT

Figure 1:
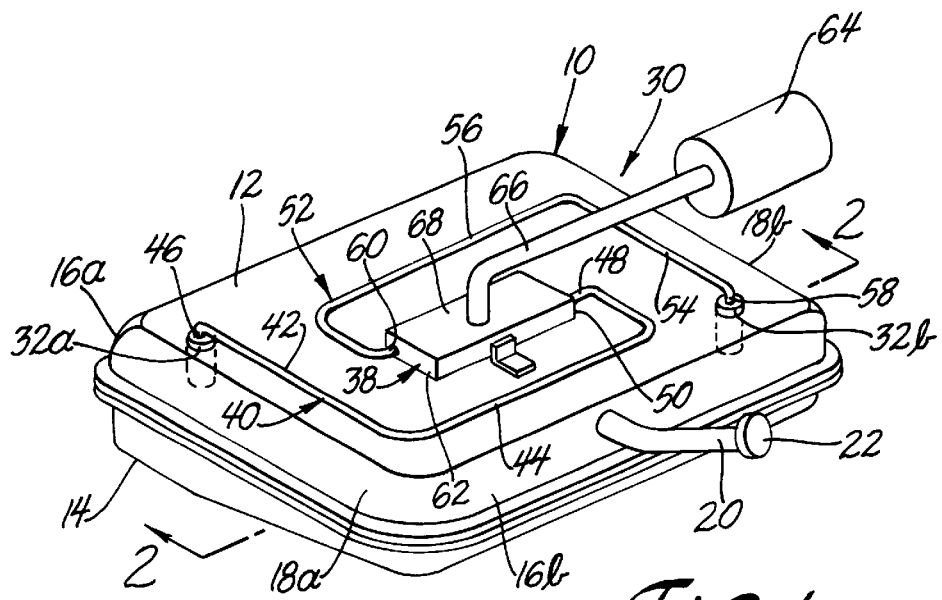
FIG. 1 is a schematic perspective view of a fuel vapor control apparatus according to this invention on a motor vehicle fuel tank.
Figure 2:
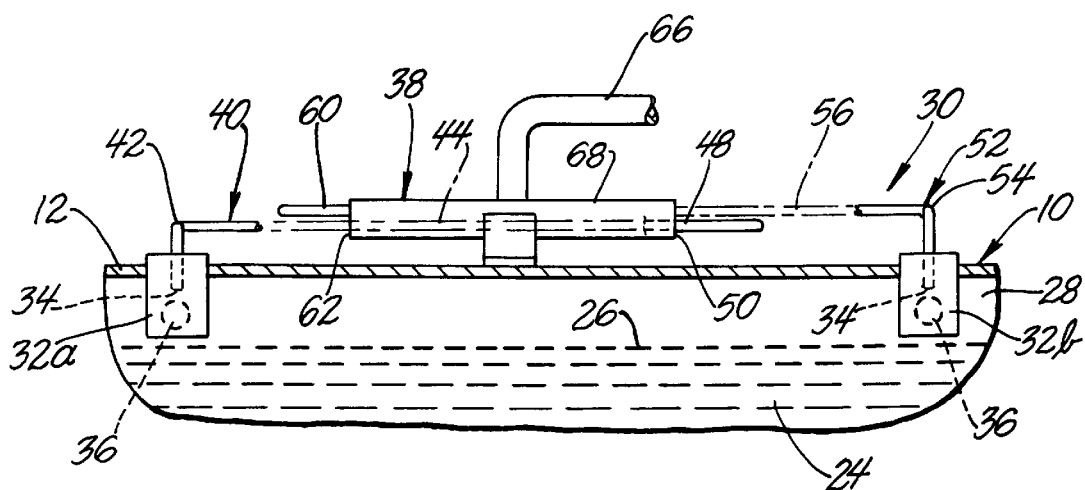
FIG. 2 is a fragmentary sectional view taken generally along the plane indicated by lines 2—2 in FIG. 1.

Referring to FIGS. 1–2, a motor vehicle fuel tank 10 includes a horizontal top 12, a horizontal bottom 14, a pair of vertical end walls 16A, 16B perpendicular to a longitudinal centerline of the motor vehicle, and a pair of vertical side walls 18A, 18B perpendicular to the end walls. A fill pipe 20 is supported on the fuel tank and includes an outboard end 22 through which liquid fuel is introduced into the fuel tank to form a pool 24 of liquid fuel having a horizontal surface 26. A vapor dome 28 filled with a mixture of air and fuel vapor is defined in the fuel tank above the surface 26 of the pool of liquid fuel The fuel tank is supported on a motor vehicle body, not shown, such that the vertical end walls 16A, 16B tip oppositely up and down when the motor vehicle is inclined in the fore and aft direction and the vertical side walls 18A,18B tip oppositely up and down when the motor vehicle is inclined laterally.

A fuel vapor control apparatus 30 according to this invention includes a pair of schematically represented vent valves 32A, 32B on the top 12 of the fuel tank at diagonally opposite corners thereof Each vent valve 32A, 32B includes an orifice 34 through which the mixture of air and fuel vapor in the vapor dome 28 is conducted out of the fuel tank. The vent valves 32A, 32B are further constructed to close automatically, e.g. as by a schematically represented float 36 below the orifice 34 in each vent valve, when the vent valves are submerged in liquid fuel to prevent the escape of liquid fuel through the vent valves.

A flat plastic secondary tank 38 of the fuel vapor control apparatus 30 is supported on the top 12 of the fuel tank 10 parallel to the plane of the top and at an elevation above the vent valves 32A, 32B. A first primary vapor duct 40 includes a longitudinal segment 42 parallel to the vertical sides 18A, 18B of the fuel tank and a lateral segment 44 is series with the longitudinal segment and parallel to the vertical ends 16A, 16B of the fuel tank. A first end 46 of the vapor duct 40 is connected to the vent valve 32A. A second end 48 of the vapor duct 40 is connected to the secondary tank 38 through an end 50 thereof facing away from the vent valve 32A. A second primary vapor duct 52 includes a longitudinal segment 54 parallel to the vertical sides 18A, 18B of the fuel tank and a lateral segment 56 is series with the longitudinal segment and parallel to the vertical ends 16A, 16B of the fuel tank. A first end 58 of the vapor duct 52 is connected to the vent valve 32B. A second end 60 of the vapor duct 52 is connected to the secondary tank 38 through an end 62 thereof facing away from the vent valve 32B.

A vapor storage canister 64 of the fuel vapor control apparatus 30 is supported on the motor vehicle body outside the fuel tank 10 and contains an adsorbent such as charcoal granules. The vapor storage canister 64 communicates with the secondary tank 38 through a secondary vapor duct 66 which opens into the secondary tank through a top side 68 thereof When the motor vehicle is parked with substantially zero fore and aft and lateral incline, FIG. 2, each of the vent valves 32A, 32B is open and exposed to the vapor dome 28 in the fuel tank. A mixture of air and fuel vapor migrates from the vapor dome to the vapor storage canister through the primary vapor ducts 40, 52, the secondary tank 38, and the secondary vapor duct 66. Fuel vapor is stripped from the mixture by the adsorbent in the vapor storage canister so that only uncontaminated air is vented or exhausted to the atmosphere. The adsorbent is later purged of retained fuel vapor by combustion air.

When the fuel tank is full and the motor vehicle is parked on an incline, one of the vent valves 32A, 32B can be submerged below the surface 26 of the pool 24 of liquid fuel in the fuel tank while the other remains exposed to the vapor dome. For example, when the motor vehicle and the fuel tank thereon are inclined such that the vertical side wall 18A is tipped down and the vertical side wall 18B is tipped up, FIG. 3, the vent valve 32A constitutes a submerged or "tipped-down" valve and the vent valve 32B constitutes an exposed or "tipped-up" valve. In the tipped-down vent valve 32A, the float 36 seals closed the orifice 34 to prevent leakage of liquid fuel through the tipped down valve into the vapor duct 40. At the same time, the tipped-up vent valve 32B remains open to expose the vapor dome to the atmosphere and to conduct the air and fuel vapor mixture from the vapor dome to the storage canister 64 through the vapor duct 52.

Figure 3:
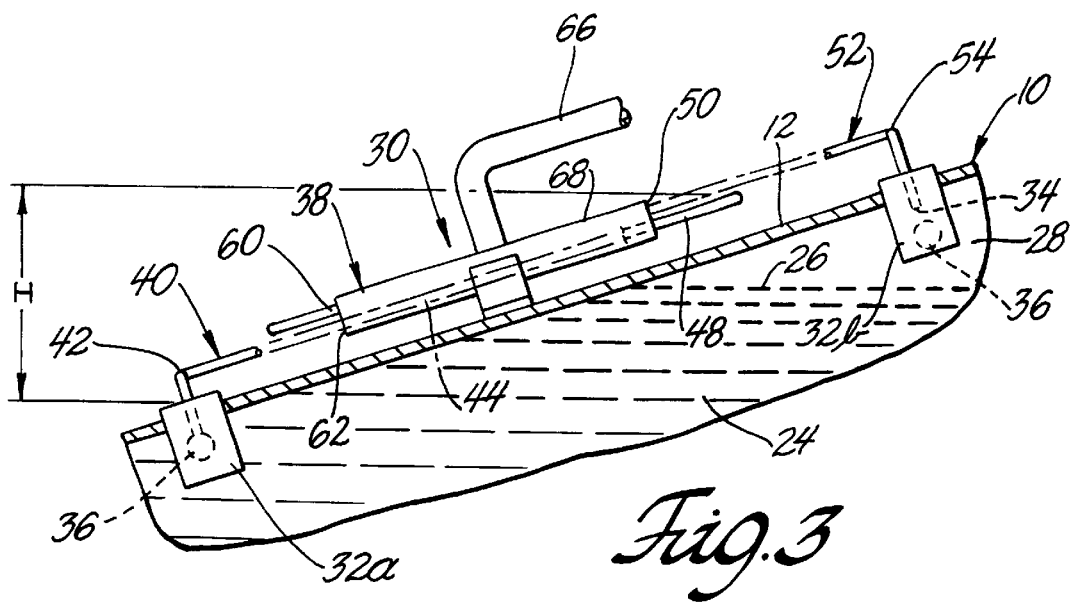
FIG. 3 is similar to FIG. 2 but illustrating the fuel vapor control apparatus according to this invention when the motor vehicle fuel tank is inclined.

With the fuel tank 10 inclined as illustrated in FIG. 3, the lateral segment 44 of the primary vapor duct 40 tips upward from the vent valve 32A through a height dimension "H" and functions as a standpipe into which flows any liquid fuel leaking through the tipped down vent valve 32A. The lateral segment 44 of the primary vapor duct 40 extends substantially the full width of the fuel tank to maximize the height dimension H. The standpipe defined by the lateral segment 44 constitutes a primary liquid trap between the tipped-down vent valve 32A and the canister 64 when the fuel tank is inclined laterally which prevents any liquid fuel leaking through the tipped-down valve from migrating to the canister as long as the top of the standpipe is higher than the surface 26 of the pool 24 of liquid fuel in the fuel tank. The lateral segment 56 of the primary vapor duct 52 likewise defines a standpipe constituting a primary liquid trap above the other vent valve 32B when the fuel tank is inclined laterally in the opposite direction. Similarly, the longitudinal segments 42, 54 of the primary vapor ducts 40, 52 define standpipes constituting primary liquid traps when respective ones of the vent valves 32A, 32B are tipped down due to fore and aft incline of the fuel tank.

The secondary tank 38 constitutes a secondary liquid trap between the canister 64 and each of the aforesaid primary liquid traps. That is, when the surface 26 of the pool 24 of liquid fuel in the fuel tank is higher than the height dimension H of the standpipe, any liquid fuel overflowing the standpipe flows into and is collected or aggregated m the secondary tank and thus prevented from flowing into the canister 64 and contaminating the adsorbent therein. Because leakage of liquid fuel through the tipped-down one of the vent valves 32A, 32B is relatively slow, the corresponding primary liquid trap will not overflow into the secondary liquid trap until after the motor vehicle has been parked for a reasonably extended period. The volume of the secondary tank 38 is calculated to aggregate liquid fuel for an additional period which, together with the initial period attributable to the primary liquid traps, exceeds the total period during which a motor vehicle may reasonably be expected to remain parked on an incline and still be in active service.

As seen best in FIG. 2, the vent valves 32A, 32B are vertically below the vapor ducts 40, 52 and the secondary tank 38 when the incline of the fuel tank is zero so that liquid fuel aggregated in the standpipes and in the secondary tank drains by gravity back into the fuel tank when the motor vehicle returns to zero incline. Further, the location of the secondary vapor duct 66 above the secondary tank affords protection against a wave of liquid fuel being swept into the canister when the motor vehicle returns to zero incline.

Figure 4:
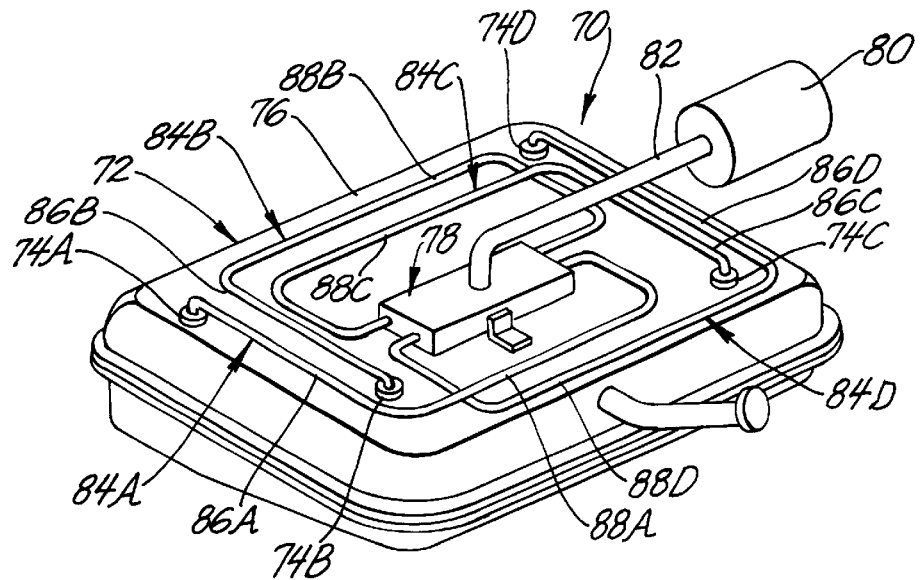
FIG. 4 is a schematic perspective view of a modified fuel vapor control apparatus according to this invention on a motor vehicle fuel tank.

A modified fuel vapor storage apparatus 70 on a fuel tank 72 is schematically illustrated in FIG. 4 and includes a plurality of four vent valves 74A, 74B, 74C, 74D mounted on a top 76 of the fuel tank at the four corners thereof A flat plastic secondary tank 78 is supported on the top of the fuel tank at an elevation above the vent valves 74A, 74B, 74C, 74D. A vapor storage canister 80 is connected to the secondary tank 78 by a secondary vapor duct 82 above the secondary tank. A plurality of four primary vapor ducts 84A, 84B, 84C, 84D extend between respective ones of the vent valves 74A, 74B, 74C, 74D and the secondary tank 78.

The four primary vapor ducts 84A, 84B, 84C, 84D include respective ones of a plurality of four longitudinal segments 86A, 86B, 86C, 86D parallel to the longitudinal centerline of the motor vehicle and the vertical sides of the fuel tank and a plurality of four lateral segments 88A, 88B, 88C, 88D perpendicular to the longitudinal segments. The longitudinal and lateral segments of the primary vapor ducts 84A, 84B, 84C, 84D define standpipes above respective ones of the vent valves when one or more of the vent valves are tipped down and submerged in liquid fuel. When the fuel tank 72 is inclined, each standpipe constitutes a privy liquid trap between the tipped-down ones of the vent valves 74A, 74B, 74C, 74D and the canister 80 which collects any liquid fuel leaking through the tipped down valves except when the top of the standpipe is below the surface of the pool of liquid fuel in the fuel tank. In that circumstance, the secondary tank 78 constitutes a secondary liquid trap between the canister 80 and each of the aforesaid standpipes in the primary vapor ducts 84A, 84B, 84C, 84D which collects or aggregates liquid fuel overflowing the standpipes. The volume of the secondary tank 78 is calculated to aggregate liquid fuel for a period which, together with the initial period of liquid aggregation attributable to the primary liquid traps, exceeds the total period during which a motor vehicle may reasonably be expected to remain parked on an incline and still be in active service.

Having thus described the invention, what is claimed is:

1. A fuel vapor control apparatus for a motor vehicle fuel tank comprising:

a fuel vapor storage canister, a plurality of vent valves each open when exposed to a mixture of air and fuel vapor and closed when submerged in liquid fuel, a mounting means operable to mount each of the plurality of vent valves on the fuel tank such that when the fuel tank is inclined a first one of the vent valves constitutes an open tipped-up valve exposed to the mixture of air and fuel vapor in a vapor dome of the fuel tank above a pool of liquid fuel in the fuel tank and a second one of the vent valves constitutes a closed tipped-down valve submerged in liquid fuel, a plurality of primary liquid trap means between the vapor storage canister and respective ones of the vent valves each operable when the fuel tank is inclined to aggregate any liquid fuel which leaks through a corresponding one of the plurality of vent valves and to drain to the fuel tank by gravity such aggregated liquid fuel when the fuel tank returns to zero incline, and a secondary liquid trap means between each of the plurality of primary liquid trap means and the vapor storage canister operable to aggregate any liquid fuel which overflows any of the plurality of primary liquid trap means and to drain to the fuel tank by gravity such aggregated liquid fuel when the fuel tank returns to zero incline.

2. The fuel vapor storage apparatus recited in claim 1 wherein each of the plurality of primary liquid trap means comprises:

a plurality of primary vapor ducts above the fuel tank each having a first end connected to a corresponding one of the vent valves and a second end in flow communication with the vapor storage canister and including a longitudinal segment and a lateral segment perpendicular to and in series flow relationship to the longitudinal segment, the longitudinal segment of each of the plurality of primary vapor ducts constituting a standpipe above the one of the plurality of vent valves connected thereto when such vent valve is tipped down and submerged in liquid fuel due to the fuel tank being inclined fore and aft, and the lateral segment of each of the plurality of primary vapor ducts constituting a standpipe above the one of the plurality of vent valves connected thereto when such vent valve is tipped down and submerged in liquid fuel due to the fuel tank being inclined laterally.

3. The fuel vapor storage apparatus recited in claim 2 wherein the secondary liquid trap means comprises:

a secondary tank above the fuel tan connected to each of the plurality of primary vapor ducts at the second end thereof, and a secondary vapor duct connected to the vapor storage canister and to the secondary tank through a top of the secondary tank.

4. The fuel vapor storage apparatus recited in claim 3 wherein:

the plurality of vent valves comprises a pair of vent valves located at a pair of diagonally opposite corners of a top of the fuel tank.

5. The fuel vapor storage apparatus recited in claim 3 wherein:

the plurality of vent valves comprises a plurality of four vent valves located at respective ones of a plurality of four corners of a top of the fuel tank.

* * * * *